Nov. 24, 1964 W. D. FOWLER 3,158,549
FUEL ASSEMBLY FOR NEUTRONIC REACTOR
Filed April 19, 1963 2 Sheets-Sheet 2

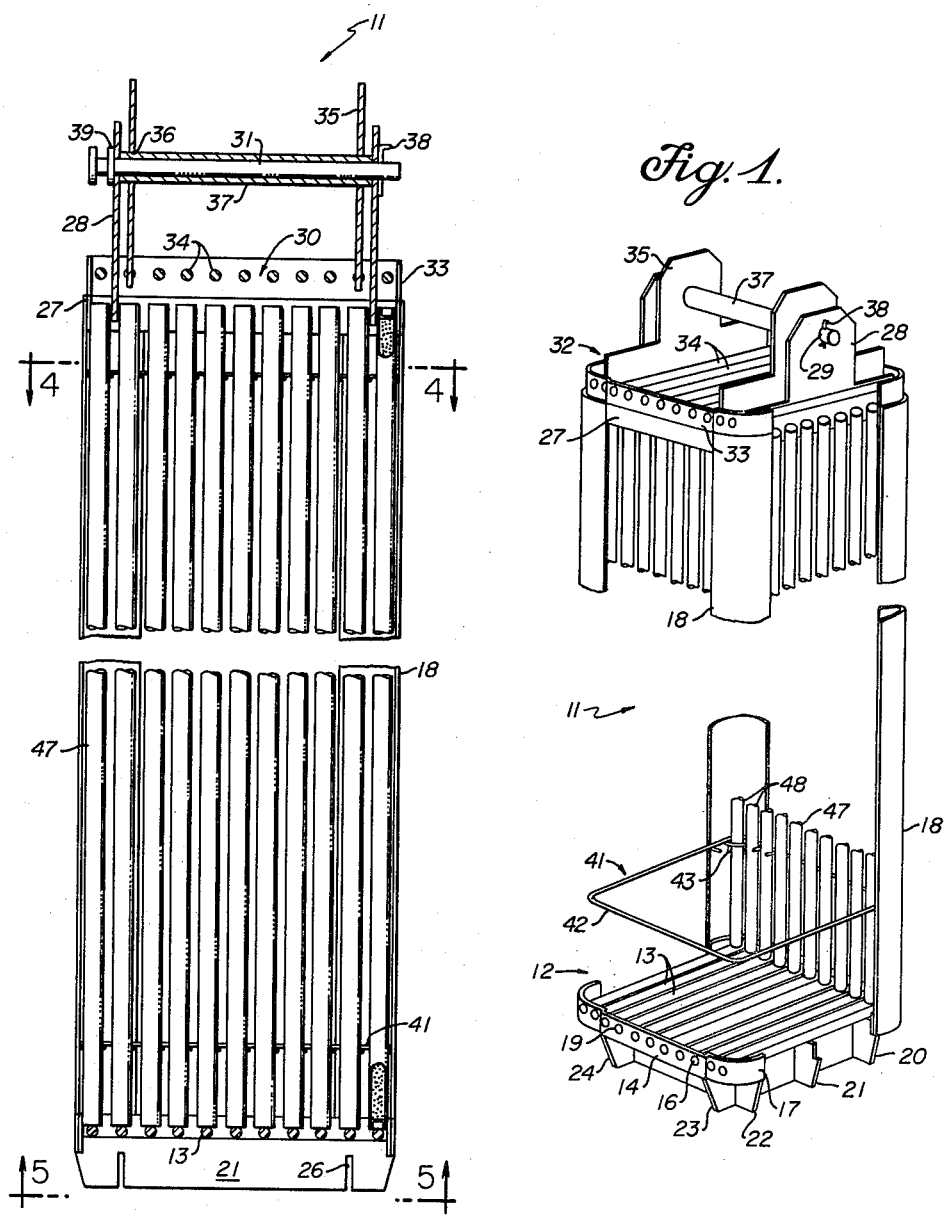

INVENTOR.
WAYNE D. FOWLER
BY
ATTORNEY.

United States Patent Office 3,158,549
Patented Nov. 24, 1964

3,158,549
FUEL ASSEMBLY FOR NEUTRONIC REACTOR
Wayne D. Fowler, Poway, Calif., assignor, by mesne assignments, to the United States of America as represented by the United States Atomic Energy Commission
Filed Apr. 19, 1963, Ser. No. 274,362
8 Claims. (Cl. 176—78)

This invention relates in general to fuel assemblies for neutronic reactors and more specifically to a fuel bundle structure employing a minimum amount of extraneous material in the structural elements supporting the fuel and other functional rods employed therein and providing ease of assembly and loading or discharge of the various rods utilized therein.

Boiling water and other types of nuclear reactors characteristically employ a core including a moderator region traversed by a number of spaced parallel fuel channels in which are disposed elements containing fissile fuel, fertile material, reactivity poisons and the like. Single fuel rod elements have been utilized in some reactor fuel channels, but many reactors, especially of high power output and of late design, employ so-called fuel bundles comprised of a sizeable plurality of relatively slender elongated rod elements arranged and supported in spaced relation to provide a bundle of such elements which may be termed a fuel bundle. In the past, such bundle assemblies have tended to utilize massive support and cladding members and means for supporting and spacing individual fuel rods which secured the individual rods rigidly together whereby large thermal stresses could be set up. Also, weldments or complicated and difficult to manipulate attachment means utilized therein did not permit or made difficult assembly and removal of fuel rods, insertion of new or varied fuel rods, etc. Moreover, the massive nature of such bundle assemblies introduced amounts of extraneous materials sufficient to adversely affect the neutron economy in the reactor, as well as to increase fabrication and capital cost outlays. In general, the designs utilized heretofore have been more or less of custom manufacture and not particularly suited to more economical and readily utilized mass production techniques.

The present invention provides a fuel bundle support and assembly structure in which a minimum of extraneous material is included, the need for close dimensional tolerances is substantially eliminated and only a limited number of standardized structural components are utilized. Provision is made for positioning and retaining the functional components securely during operation, but permitting easy removal and handling of the fuel bundle as well as the insertion and withdrawal of included components as may be required at requisite intervals during operation. Moreover, provision is made to accommodate fuel rod elements and the like which deviate from design dimensions in fabrication or depart from such dimensions during operation, as well as to serve other purposes as described more fully hereinafter.

Accordingly, it is an object of the present invention to provide a novel fuel rod element or bundle assembly structure for a nuclear reactor.

Another object of the invention is to provide a unitary fuel rod bundle assembly structure presenting a minimum amount of extraneous material in nuclear reaction zones of a nuclear reactor fuel channel.

Still another object of the invention is to provide a fuel rod assembly which introduces a minimum restriction to coolant flow in the fuel channel of a nuclear reactor.

A further object of the invention is to provide a fuel rod assembly which introduces a minimum amount of non-heat transfer surface into contact with the active region of the core upon insertion of the assembly.

A still further object of the invention is to provide a fuel rod assembly which permits any given fuel rod or rods to be removed from the bundle and replaced independently and without disturbing either the assembly or other fuel rods therein.

Still another object of the invention is to provide a fuel rod assembly which is adapted to receive fuel rod elements of varying length and of otherwise moderately varying dimensions.

One other object of the invention is to provide a fuel rod assembly structure which is adapted to accommodate a variety of end closure utilized on individual fuel rod elements.

Other objects and advantageous features of the invention will be set forth in the following description and accompanying drawing, of which:

FIGURE 1 is a perspective view of the fuel bundle or assembly of the invention partly cut away to better illustrate internal constructional details;

FIGURE 2 is a vertical cross-sectional view of the fuel assembly of FIGURE 1;

Figure 3:
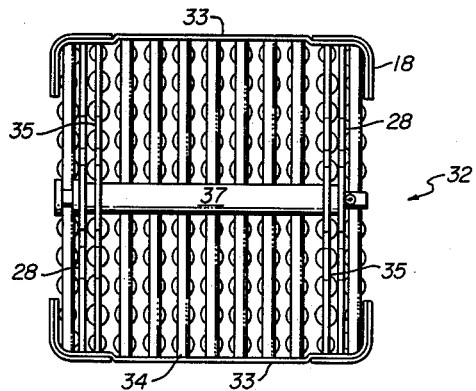
FIGURE 3 is a plan view of the upper portion of the fuel assembly of FIGURE 2.

The fuel rod element bundle assembly of the invention is intended for disposition within a fuel channel of a nuclear reactor core which channel is traversed by a coolant utilized to transport heat therefrom. The assembly of the invention may be utilized with various reactors, but is especially suited for use in boiling water or pressurized water reactors of high power density. The fuel channels of such a reactor may have a square or other polygonal cross section of several inch internal diameter and the fuel rods and other functional rod elements, such as poison rods are generally of fractional inch thickness dimension and of several feet in length. The fuel rod bundle assembly structure of the invention will be described with reference to an embodiment adapted to a square cross-section fuel channel; however, it will be apparent that fuel bundle assemblies for other cross-sectional configurations may be fabricated in accordance with the teachings of the invention. Metals such as stainless steel, aluminum, zirconium alloys and the like which are suitable for use in a reactor environment are used in the fabrication thereof.

With particular reference to FIGURES 1 and 2 of the accompanying drawing, the fuel rod bundle assembly 11 of the invention is provided with a square polygonal openwork base 12 through which a coolant may pass with a minimum of obstruction and constructed as with a plurality of transversely disposed parallel coplanar rod members 13 supported terminally by means of a pair of spaced parallel elongated support plates 14 as by means of bores 19 provided in the plates 14 engaging ends 16 of rods 13 and forming a grating. Welding, preferably, is used in securing said rods and plates as for securing other components elsewhere herein although other methods such as crimping may be used as appropriate. The plate members 14 are extended at the ends 17 and curved to provide rounded corners for said base. Elongated curved angular section corner support members 18 are welded to said rounded end corners 17 to extend upwardly for purposes described more full hereinafter.

The aforesaid base 12 includes a plurality of base support members 20, 21, and 22 in the form of elongated plates welded on one elongated edge in an upright position to rod members 13 in a direction transverse to the orientation of the rods 13. Base support members 23 and 24 interlock with members 20, 21, and 22 by means of slots (not shown) and are also welded to rods 13 in the direction of orientation of said rods. The ends of support members 20, 22, 23, and 24 further are secured in interlocking relationship with plate members 14 and angle members 18. Slots 26 may be provided in support members 20, 21, and 22 for engagement with transverse supporting members (not shown) provided as in conventional practice at the lower end of the reactor fuel channel in which the laden assembly is to be disposed.

The corner angle members 18 of previous mention extend upwardly from base 12, each member 18 being curved to fit around each corner to provide strength and protection to fuel rods disposed in the bundle assembly therein. At the upper end of corner members 18 a pair of elongated members 27 are welded between corner angle members 18 in coplanar relation corresponding to the disposition of plate members 14 on base 12. Further support of the upper portion of the bundle assembly is provided by two weldment members 28 extending between plate members 27 at each end thereof and being secured terminally thereto. The weldment members 28 may comprise plates having an upward extension through which a transpiercing bore 29 extends, the bores in the respective members being oriented in aligned relationship. Other locking bar receiver means may likewise be employed. With such an arrangement members 27 and weldment members 28 define an upper opening 30 into the volume disposed within the corner members 18. Said weldment members 28 and aligned bores 29 thereby provide a means for lifting the assembly 11 as by means of a handle bar 31 inserted through bores 29.

In order to secure and retain fuel rods, etc., in the assembly 11 the upper portion thereof is provided with a grating cover member 32 which fits within the opening 30 at the upper end of said assembly 11. Cover member 32 may comprise a pair of spaced parallel plate members 33 shaped to conform to the inner surfaces of plate members 27 with rod members 34 of circular cross section, preferably extending therebetween and secured as in providing the grating of said base 12. A pair of handle plates 35 are welded terminally to plate members 33 in spaced parallel relation with a portion projecting upwardly above rods 34 adjacent to weldments 28 which are arranged to project upwardly through grating openings of cover member 32. The handle member projections are provided with bores 36 in mutual alignment and in alignment with bores 29 of said weldments 28. A sleeve handle element 37 is disposed within and extending between said handle member projections to receive the handle bar 31 and thereby locking said cover member in closed position. A pin 38 may be used to hold handle bar 31 in position, said handle bar 31 preferably having a stop shoulder 39 which abuts closely against a weldment 28.

Figure 4:
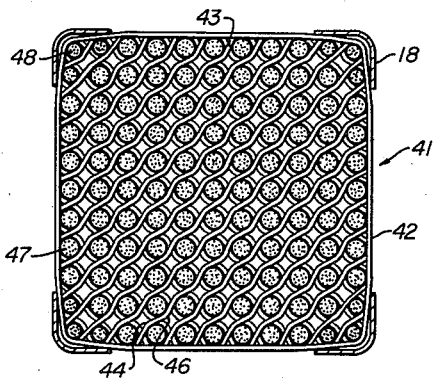
FIGURE 4 is a transverse cross-sectional view of the fuel assembly along line 4—4 of FIGURE 2.
Figure 5:
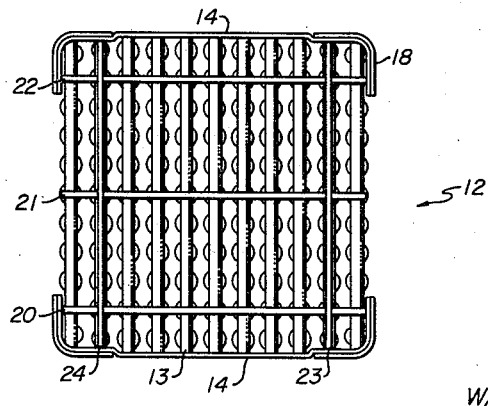
FIGURE 5 is a transverse cross-sectional view of the fuel assembly taken along line 5—5 of FIGURE 2.

Intermediate between top 32 and bottom 12 of the fuel assembly are disposed a plurality of parallel grids 41 in spaced relation to each other for the purpose of spacing and retaining fuel rods, etc., in said assembly 11. As may best be seen in FIGURE 2, spacers 41 are shown at four different heights, but obviously fewer or additional spacers could be used if provided adequate structural rigidity is obtained. Each spacer grid 41 comprises an outer wire or rod frame member 42 welded at the corners to the insides of angle members 18. A meshwork of grid wires 43 is secured to frame 42, such meshwork having intersecting wires providing an opening into which a fuel rod may be inserted with at least one wire being positioned between each element in each direction so that each fuel element when inserted is surrounded by the intersecting wires. With such a construction, the individual wires may be adjusted or positioned by bending or twisting as desired to accommodate different sized fuel elements or poison rods 47 and 48. Any gridwork providing three or more wires in contact with each fuel element in encompassing relation may be used. In the preferred embodiment, grid wires 43 intersect frame 41 at right angles, or diagonally the wires forming in and out bends 44 and 46 between each intersection with another wire 43. The bends contact fuel elements 47 as may be seen from FIG. 4. These bends may be adjusted to appropriately position and space individual elements or to accommodate various size elements. It will be apparent that the interstices of said meshwork of grid wires 43 must register with transverse bars 13 and 34 or closely spaced bars must be utilized in these positions in order that proper support and retention functions are attained. Also, such registry is preferred since minimum resistance to coolant flow is then attained.

For loading or unloading during use of the fuel assembly of the invention, handle bar 31 is removed and removable top cover 32 is taken off. Fuel rods 47 are inserted into the space within the assembly into the interstices of the meshwork of grid wires 43. Smaller, poison rods 48 are inserted into the corner positions in bundles where smaller positions have been formed by deeper bends or more closely spaced wires, in order to effect neutron flux equalization at the corner fuel rod locations. It should be noted that the corner angle members 18 provided as described hereinbefore also assist in controlling corner rod neutron flux peaking and thereby facilitate maintenance of a more uniform flux level and reactivity level in the bundle. Moreover, it will be noted that repositioning or adjustment of the rod element positions is also facilitated since it is necessary to merely bind or twist the wires of said meshwork to provide the relocation and/or accommodate different rod elements. The rods 47 and 48 need not be of the same size or length, but may vary within the tolerances provided by wires 43 and spacing of base 12 and top 32. When the rods 47 and 48 have all been inserted, removable top 32 is placed down over weldments 28 as above and the handle bar 31 is inserted. The entire assembly may be then lifted by handle bar 31 and inserted into a reactor core. After use, the reverse procedure may be used to remove rods from assembly 11.

Reference core parameters of a core in which the fuel rod assembly of the invention may be used are given in the following table and additional information concerning a reactor utilizing these parameters may be obtained from report GEAP-3860 entitled "High Power Density Development Project," Interim Report, 300 MWeHPD Conceptual Design Study, prepared by the General Electric Company for the U.S. Atomic Energy Commission and available from Technical Information Service, U.S. Atomic Energy Commission, Oak Ridge, Tennessee.

*Table 1*

1. RATED CONDITIONS

| | |
|---|---|
| Reactor thermal power (MW) | 975 |
| Gross electrical power (MW) | 312 |
| Net electrical power (MW) | 300 |
| Reactor steam rate (millions lbs./hr.) | 4.09 |
| Core coolant flow rate (millions lbs./hr.) | 45 |
| Reactor pressure (p.s.i.a.) | 1,050 |
| Feedwater return temperature (° F.) | 400 |
| Core inlet subcooling (B.t.u./lb.) | 15.8 |
| Core exit steam quality (wt. fraction of steam) | 0.091 |
| Capacity factor (percent) | 80 |

Table 1—Continued

2. FUEL

| | Initial | Equilibrium |
|---|---|---|
| Avg. exposure design objective (MWD/ton-U) | 15,000 | 15,000 |
| UO$_2$ cold density (gm./cm.$^3$) | 10.4 | 10.4 |
| Clad material | 304 SS | 304 SS |
| Standard rod enrichments: | | |
|   Initial U$^{235}$ (percent) | 2.90 | 2.80 |
|   Discharged U$^{235}$ (percent) | 1.49 | 1.41 |
|   Discharged Pu (percent) | 0.625 | 0.63 |
| Corner rod enrichments (12 per assembly): | | |
|   Initial U$^{235}$ (percent) | 2.40 | 2.30 |
|   Discharged U$^{235}$ (percent) | 0.99 | 0.90 |
|   Discharged Pu (percent) | 0.685 | 0.70 |
| Fuel pellet diameter (inches) | 0.387 | 0.387 |
| Clad outside diameter (inches) | 0.412 | 0.412 |
| Clad thickness (inches) | 0.010 | 0.010 |
| Active length of fuel rod (inches) | 115 | 115 |
| Number of segments per fuel rod | 1 | 1 |
| Number of fuel rods per assembly | 109 | 121 |
| Number of fuel assemblies in core | 188 | 188 |
| Number of poison rods (B$^4$C) per fuel assembly | 12 | None |
| Total number of fuel rods | 20,492 | 22,748 |
| Weight of each fuel assembly (lbs.) | 750 | 750 |
| Overall length of fuel assembly (inches) | 126 | 126 |
| Total weight of UO$_2$ in reactor (lbs.) | 108,000 | 120,000 |
| Total weight of U$^{235}$ in reactor (kg.) | 1,228 | 1,320 |
| Total weight of 304 SS in fuel assembly (lbs.) | 51 | 51 |
| UO$_2$ throughput rate (lbs./yr.) | 37,900 | 37,900 |
| Plutonium production rate (gm./yr.) | 95,500 | 96,500 |
| Refueling cycle time (months) | 8.6 | 9.5 |
| Fuel assembly replacements per cycle | 47 | 47 |

3. CORE ASSEMBLY

| | |
|---|---|
| Core diameter, circumscribing circle (inches) | 116.6 |
| Core diameter, circle of equal area (inches) | 109.2 |
| Moderator/fuel volume ratio, initial-equilibrium | 2.5–2.3 |
| Active core length, inches | 115 |
| Thermal shield thickness, estimated (inches) | 3.0 |
| Thermal shield inside diameter (inches) | 124 |
| Annulus between thermal shield and vessel wall, inches | 2.0 |
| Reflector (water) thickness—core to thermal shield: | |
|   Equivalent (inches) | 8.0 |
|   Minimum (inches) | 3.9 |
| Number of channel assemblies | 188 |
| Inside channel dimension, square (inches) | 6.445 |
| Channel wall thickness (inches) | 0.062 |
| Channel material | Zr-4 |
| Control element: | |
|   Number of assemblies | 88 |
|   Diagonal pitch (inches) | 10.0 |
|   Stroke length, (inches) | 115 |
|   Shape | Cruciform |
|     Cruciform span (inches) | 12.0 |
|     Blade thickness (inches) | 0.25 |
|     Annular clearance to channel surface (inches) | 0.125 |
|   Length: | |
|     Poison section (inches) | 110 |
|     Over-all (inches) | 123.5 |
|   Estimated total weight of assembly (lbs.) | 230 |
|   Poison material | B$_4$C |

4. REACTOR VESSEL

| | |
|---|---|
| Inside diameter at core (inches) | 134 |
| Pressure: | |
|   Normal operation (p.s.i.g.) | 1,035 |
|   Design at 650° F (p.s.i.g.) | 1,295 |
|   Hydrostatic test (p.s.i.g.) | 1,940 |

5. HEAT TRANSFER

| | Initial | Equilibrium |
|---|---|---|
| Fraction of reactor power generated in fuel | 0.96 | 0.96 |
| Fraction of reactor power transferred to in-channel coolant | 0.98 | 0.98 |
| Minimum effective heat transfer area (ft.$^2$) | 21,200 | 23,500 |
| Average core power density (kw./l.) | 55 | 55 |
| Average fuel specific power (kw/kg.-U) | 22.6 | 20.3 |
| Average in-channel coolant power density (kw./l.) | 107 | 107 |
| Minimum boiling burnout margin | 1.53 | 1.53 |
| Heat flux and fuel temperature—Design heat flux and temperature peaking factors— | | |
|   Gross peaking factor: | | |
|     Radial (includes flux monitoring error) | 1.30 | 1.38 |
|     Axial | 1.62 | 1.68 |
|     Gross | 2.10 | 2.3 |
|   Inter control rod peaking | 1.15 | 1.15 |
|   Corner rod peaking | 1.20 | 1.20 |
|   Steady-state overpower | 1.09 | 1.09 |
|   Allowance for fast transient | 1.10 | 1.10 |
|   Over-all design heat flux and temp. peaking factor | 3.50 | [1] 3.85 |
| Heat flux: | | |
|   Average at steady state, rated conditions (B.t.u./hr.-ft.$^2$) | 147,800 | 132,500 |
|   Maximum at steady state, rated conditions (B.t.u./hr.-ft.$^2$) | 424,800 | 424,800 |
|   Maximum at peak design transients (B.t.u./hr.-ft.$^2$) | 515,000 | 515,000 |
| Fuel temperature at rated conditions:[2] | | |
|   Maximum UO$_2$ temperature: | | |
|     Steady state (° F.) | 4,140 | 4,140 |
|     Peak design transients (° F.) | 4,890 | 4,890 |
|   Maximum pellet surface temperature: | | |
|     Steady state (° F.) | 808 | 808 |
|     Peak design transient (° F.) | 876 | 876 |
|   Maximum clad inside temperature: | | |
|     Steady state (°F.) | 596 | 596 |
|     Peak design transients (° F.) | 603 | 603 |
|   Maximum clad outside temperature: | | |
|     Steady state (° F.) | 566 | 566 |
|     Peak design transients (° F.) | 566 | 566 |
| Coolant conditions: | | |
|   Total flow through fuel channels (millions lbs./hr.) | 40.5 | 40.5 |
|   Total flow bypassed between channels (millions lbs./hr.) | 4.5 | 4.5 |
|   Flow area inside channels (square inches) | 25.42 | 25.42 |
|   Hydraulic diameter inside channels (inches) | 0.60 | 0.60 |
|   Fraction of total water moderator volume in fuel channels | 0.79 | 0.79 |
| Design channel power peaking factors: | | |
|   Nominal radial neutron flux distribution (controlled) | 1.30 | 1.38 |
|   Allowance for control rod movement and fuel cyclings | 1.10 | 1.10 |
|   Allowance for flux monitoring errors | 1.05 | 1.05 |
|   Allowance for instrument error and maneuvering | 1.09 | 1.09 |
|   Allowance for fast transient (steady-state equivalent) | 1.10 | 1.10 |
|   Over-all design channel power peaking factor | 1.8 | 1.91 |
| Design channel flow factors: | | |
|   Nominal radial flow distribution (orificed) | 1.4 | 1.4 |
|   Allowance for orifice error and assembly tolerances | 0.90 | 0.90 |
|   Allowance for flow reduction during overpower | 0.95 | 0.95 |
|   Design hot channel flow factor | 1.2 | 1.2 |
| Coolant temperature: | | |
|   Average at core inlet (° F.) | 538 | 538 |
|   Saturation, 1050 p.s.i.a. (° F.) | 550.6 | 550.6 |
| Coolant inlet enthalphy (B.t.u./lb.) | 534.2 | 534.2 |
| Coolant velocity in fuel assemblies, avg. at inlet (ft./sec.) | 7.25 | 7.25 |
| Exit steam quality: | | |
|   Average from core at rated conditions (percent) | 9.1 | 9.1 |
|   Average from channels at rated conditions (percent) | 10.1 | 10.1 |
|   Maximum from channels at peak design transient (percent) | 19.6 | 19.6 |
| Steam volume fraction: | | |
|   Over-all average from total water moderator | 0.237 | 0.237 |
|   Average from channels at rated conditions | 0.300 | 0.300 |
|   Maximum at peak design transient | 0.433 | 0.433 |
| Total number of core orifice zones | 2 | 2 |

| | Inner Zone | Outer Zone |
|---|---|---|
| Number of assemblies per zone | 120 | 68 |
| Reactor pressure losses: | | |
|   Fuel assembly inlet orifice (p.s.i.) | 3.25 | 5.27 |
|   Core friction, momentum changes and abrupt losses (p.s.i.) | 3.98 | 1.80 |
|   Density head differential (p.s.i.) | 2.21 | 2.37 |
|   Total core pressure drop (p.s.i.) | 9.44 | 9.44 |

6. PHYSICS

| | |
|---|---|
| Control rod worth (percent$^\Delta$k./k.) | 22 |
| Supplementary poison rod, cold operating (percent$^\Delta$k./k.) | 6 |
| K$_{eff}$ cold clean—blades in | 0.95 |
| K$_{eff}$ operating—blades out (including Xe and Sm) | 1.11 |
| $^\Delta$K worst blade ejection (percent$^\Delta$K.) | 6 |

[1] Permitted to allow less residual control insertion at end of fuel cycle, corresponding to increased core loading by substitution of fuel for temporary poison rods.
[2] Temperatures are based on fuel thermal conductivity of 1.1 B.t.u./hr.-ft.$^2$—° F./ft.

It should be understood that the foregoing description is merely illustrative of one embodiment of a fuel assembly which incorporates the features of the present invention. Modifications in the structural features of the

What is claimed is:

1. In a lightweight nuclear reactor fuel rod assembly structure, the combination comprising a generally rectangular base having a grating platform upper surface area adapted to support the bases of a plurality of nuclear reactor component rods thereon, elongated linear corner support members secured to the corners of said base and extending upwardly therefrom, plate members joining the upper portions of said corner support members and defining a generally rectangular opening providing access to the space within said corner members, a cover locking bar receiver means secured to an oppositely disposed pair of said plate members, a cover comprising a generally rectangular frame member adapted to fit within said opening at the upper portion of said corner support members and a grating secured within said frame, handle bar means associated with said cover for engaging said locking bar receiver means, and at least one spacer member including a grid of deformable wire members supported within the space enclosed within said corner support members in which grid the interstices are adapted to receive nuclear fuel and other rod components inserted through the aforesaid opening.

2. A fuel rod assembly structure as defined in claim 1 wherein said corner support members have a generally angular configuration encompassing the corners of said base.

3. A fuel rod assembly structure as defined in claim 1 wherein said locking bar receiver means comprises extensions of said pair of plate members and said extensions include locking bar receiver means.

4. In a lightweight nuclear reactor fuel rod assembly structure, the combination comprising a generally rectangular base having a grating platform upper surface area adapted to support the bases of a plurality of nuclear reactor component rods thereon, elongated linear corner support members secured to the corners of said base and extending upwardly therefrom, plate members joining the upper portions of said corner support members and defining a generally rectangular opening providing access to the space within said corner members, said plate members including an opposing pair of a weldment plates having extensions projecting upwardly therefrom each of said plates including locking bar receiver means, a cover comprising a generally rectangular frame adapted to fit within said opening at the upper end of said corner support members and a grating of parallel bars secured within said frame, said cover including upwardly projecting members bearing a handle portion, a handle bar associated with said projecting members for locking said cover upon engagement with said locking bar receiver means, and at least one space member including a grid of deformable wire members supported within the space enclosed within said corner support members in which grid the interstices are adapted to receive nuclear fuel and other rod components inserted through the aforesaid opening.

5. A fuel rod assembly structure as defined in claim 4 wherein said corner support members have a generally angular configuration encompassing the corners of said base.

6. A fuel rod assembly structure as defined in claim 4 wherein said grid of deformable wires includes a sufficient number of intersecting wire elements to contact said fuel rods at at least three peripherally spaced locations.

7. A fuel rod assembly structure as defined in claim 4 wherein transverse elements of said grating of said base and of said cover are in registry with the interstices of said grid in said spacer member.

8. In a lightweight nuclear reactor fuel rod assembly structure, the combination comprising a generally rectangular base having a grating platform upper surface area adapted to support the bases of a plurality of nuclear reactor component rods thereon, elongated linear corner support members secured to the corners of said base and extending upwardly therefrom, plate members joining the upper portions of said corner support members and defining a generally rectangular opening providing access to the space within said corner members, said plate members including an opposing pair of weldment plates having extensions projecting upwardly therefrom each of said plates including locking bar receiver means, a cover comprising a generally rectangular frame adapted to fit within said opening at the upper end of said corner support members and a grating of parallel bars secured within said frame, said cover including upwardly projecting members bearing a handle portion, a handle bar associated with said projecting members for locking said cover upon engagement with said locking bar receiver means, at least one spacer member including a grid of deformable wire members supported within the space enclosed within said corner support members in which grid the interstices are adapted to receive nuclear fuel and other rod components inserted through the aforesaid opening, and nuclear reactor rod components including fuel rods containing fissile materials disposed within the space within said support members and poison rod elements disposed in corner locations, said rod components being spaced and retained within the interstices of said grid of said spacer members.

References Cited in the file of this patent
UNITED STATES PATENTS

| | | |
|---|---|---|
| 2,994,657 | Petrick | Aug. 1, 1961 |
| 3,133,867 | Frisch | May 19, 1964 |